(12) United States Patent
Shang et al.

(10) Patent No.: US 11,118,446 B2
(45) Date of Patent: Sep. 14, 2021

(54) SYSTEM AND METHOD FOR DRILLING FLUID PARAMETERS DETECTION

(71) Applicant: Baker Hughes Oilfield Operations LLC, Houston, TX (US)

(72) Inventors: Weihua Shang, ShangHai (CN); Gang Cheng, ShangHai (CN); Ran Niu, ShangHai (CN); Yao Chen, ShangHai (CN); Fengguo Tian, ShangHai (CN)

(73) Assignee: Baker Hughes Oilfield Operations LLC, Houston, TX (US)

( * ) Notice: Subject to any disclaimer, the term of this patent is extended or adjusted under 35 U.S.C. 154(b) by 188 days.

(21) Appl. No.: 15/317,223

(22) PCT Filed: Jun. 12, 2015

(86) PCT No.: PCT/US2015/035520
§ 371 (c)(1),
(2) Date: Dec. 8, 2016

(87) PCT Pub. No.: WO2015/191979
PCT Pub. Date: Dec. 17, 2015

(65) Prior Publication Data
US 2017/0107812 A1  Apr. 20, 2017

(30) Foreign Application Priority Data

Jun. 13, 2014 (CN) .......................... 201410264062.3

(51) Int. Cl.
*E21B 33/06* (2006.01)
*E21B 47/11* (2012.01)
(Continued)

(52) U.S. Cl.
CPC .............. *E21B 47/13* (2020.05); *E21B 33/06* (2013.01); *E21B 47/11* (2020.05); *G01F 1/708* (2013.01)

(58) Field of Classification Search
CPC .... E21B 33/06; E21B 33/064; E21B 47/1015; E21B 47/122; E21B 47/11; E21B 47/13; G01F 1/708
See application file for complete search history.

(56) References Cited

U.S. PATENT DOCUMENTS

| 7,180,288 B2 | 2/2007 | Scheven |
| 7,334,651 B2 | 2/2008 | Wu |

(Continued)

FOREIGN PATENT DOCUMENTS

| CN | 201152171 Y | 11/2008 |
| CN | 102289638 A | 12/2011 |

(Continued)

OTHER PUBLICATIONS

First Office Action and Search issued in connection with corresponding CN Application No. 201410264062.3 dated Sep. 26, 2017.
(Continued)

*Primary Examiner* — Matthew R Buck
(74) *Attorney, Agent, or Firm* — Hogan Lovells US LLP (57) ABSTRACT

A system and method are described which are useful for monitoring parameters of drilling fluid within a drilling system comprising a drilling assembly. The drilling assembly is connected between a drilling platform and a wellhead and is useful for more safely drilling a wellbore necessary for hydrocarbon exploration and production by signaling the occurrence of a kick. The drilling assembly comprises a reader module for reading data information of at least one RF tag dispersed in a returned drilling fluid. The data information of the RF tag is transmitted to a controller via a communication link to calculate related parameters of the returned drilling fluid. A method for monitoring parameters of drilling fluid, and an allied blowout preventer for a drilling system are also provided.

21 Claims, 7 Drawing Sheets

(51) Int. Cl.
*E21B 47/13* (2012.01)
*G01F 1/708* (2006.01)

(56) References Cited

U.S. PATENT DOCUMENTS

| | | | |
|---|---|---|---|
| 8,016,036 B2 | 9/2011 | Kirkwood et al. | |
| 10,047,604 B2* | 8/2018 | Graves | E21B 47/1015 |
| 2008/0316049 A1* | 12/2008 | Verret | E21B 47/10 |
| | | | 340/854.6 |
| 2009/0266544 A1 | 10/2009 | Redlinger et al. | |
| 2010/0044034 A1* | 2/2010 | Bailey | E21B 47/12 |
| | | | 166/253.1 |
| 2010/0139386 A1* | 6/2010 | Taylor | E21B 47/0003 |
| | | | 73/152.23 |
| 2010/0193184 A1* | 8/2010 | Dolman | E21B 47/1015 |
| | | | 166/253.1 |
| 2012/0075113 A1 | 3/2012 | Loi et al. | |
| 2012/0132418 A1* | 5/2012 | McClung, III | B82Y 15/00 |
| | | | 166/250.12 |
| 2013/0319767 A1 | 12/2013 | Wilson et al. | |

FOREIGN PATENT DOCUMENTS

| | | |
|---|---|---|
| EP | 0 848 512 A3 | 5/2000 |
| EP | 2 024 763 A1 | 2/2009 |
| WO | 2007052864 A1 | 5/2007 |
| WO | 2008/028746 A1 | 3/2008 |
| WO | 2011/017278 A1 | 2/2011 |

OTHER PUBLICATIONS

Hargreaves et al., "Early Kick Detection for Deepwater Drilling: New Probabilistic Methods Applied in the Field", Society of Petroleum Engineers, OnePetro, pp. 1-11, Sep. 30-Oct. 3, 2001.

Cayeux et al., "Advanced Drilling Simulation Environment for Testing New Drilling Automation Techniques and Practices", Society of Petroleum Engineers, OnePetro, vol. No. 27, Issue No. 4, pp. 559-573, Dec. 2012

A PCT Search Report and Written Opinion issued in connection with corresponding PCT Application No. PCT/US2015/035520 dated Nov. 4, 2015.

* cited by examiner

SYSTEM AND METHOD FOR DRILLING FLUID PARAMETERS DETECTION

FIELD

The present disclosure relates to a drilling system, particularly to a system and method for monitoring a drilling fluid in a drilling system.

BACKGROUND

In hydrocarbon exploration, a drill string obtains necessary energy at a sea platform to drive a drill head to rotate, during which a drilling fluid (or drilling mud) from a fluid tank disposed at the sea platform reaches the drill head through the drill string, and then returns to a fluid reservoir through an annular space arranged between the drill string and a riser housing. The drilling fluid maintains a certain level of hydrostatic pressure, so as to balance a pressure of a fluid from a wellbore, and to cool the drill. In addition, the drilling fluid blends with materials generated during wellbore formation to carry the same to the surface of the sea for further treatment.

In some cases, the pressure of the fluid entering into the wellbore from the formation is greater than the pressure of the drilling fluid, resulting in a penetration of undesired fluid into the wellbore, which may be referred to as a "kick" in the art. Under certain circumstances, the occurrence of a kick has potential risks, which may include equipment damage and serious adverse effects to operators and the environment. In order to avoid such negative effects, it is necessary to predict the kick well in advance, so as to close a shutoff valve of a blowout preventer or to regulate the density of the drilling fluid to mitigate potential negative effects of the kick.

At present, a conventional prediction method for detecting a kick is measuring a flow volume variation of the drilling fluid. In fact, output of flowmeters other than Coriolis flowmeters (mass flowmeters) are all affected by flow shape. Therefore, it is desired to measure the fluid flow reliably in a well developed flow shape. However, during drilling, the motion of the drill string may affect the flow shape. Meanwhile, since the composition of the drilling fluid may be sufficiently complex such that its flow shape cannot be determined. Accordingly, there is a significant need to measure a flow volume accurately and reliably. A typical mass flowmeter, due to its inherent limitations, is not suitable for subsea operation. Neither is it suitable for measuring the flow of multiphase fluids comprising gases or large particles, or for measuring the flow of fluids having a high viscosity. For these reasons a typical mass flowmeter is generally not suitable for measuring flow of a typical drilling fluid. In order to predict kick phenomena more accurately and reliably, it is desired to discover a method for measuring a flow velocity and a flow volume which is unaffected by the fluid shape, so as to provide important basis for kick predication.

Accordingly, it is necessary to provide an improved system and method for solving the above technical problems.

SUMMARY

In view of the technical problems as discussed above, one aspect of the present disclosure is to provide a drilling system, which comprises: a drilling assembly, connected between a drilling platform and a wellhead for drilling a wellbore, the drilling assembly comprising a reader module for reading data information of radio frequency (RF) tags dispersed in a returned drilling fluid, the data information of the RF tags being transmitted to a controller via a communication link to calculate related parameters of the returned drilling fluid.

Another aspect of the present disclosure is to provide a method for monitoring parameters of a drilling fluid, comprising the following steps:

injecting a drilling fluid mixed with at least one RF tag into a drilling assembly;

reading data information of an RF tag moving with a returned drilling fluid by a reader module; and receiving the data information of the at least one RF tag to calculate related parameters of the returned drilling fluid.

Another aspect of the present disclosure is to provide a blowout preventer (BOP) for a drilling system, comprising a reader module for reading data information of RF tags dispersed in a returned drilling fluid of the drilling system, the data information of the RF tags being transmitted to a controller of the drilling system via a communication link to calculate related parameters of the returned drilling fluid, each RF tag including one unique tag identification number.

Compared with the prior art, the system and method for monitoring parameters of a drilling fluid provided by the present disclosure adapts Radio Frequency Identification (RFID) technology to monitor the related parameters of the returned drilling fluid. A reader module may rapidly read a tag identification number signal of the RF tag moving with the returned drilling fluid and transmit it to a controller. The controller may decode and identify the tag identification number signal to calculate a movement speed of the RF tag in the returned drilling fluid, and then to obtain the flow velocity and the flow volume of the drilling fluid. The method provided by the present disclosure may improve accuracy in measuring the flow velocity and the flow volume of a drilling fluid, thereby enhancing the reliability for kick prediction, and responding rapidly thereto.

BRIEF DESCRIPTION OF THE DRAWINGS

The present disclosure can be better understood in light of description of embodiments of the present disclosure with reference to the accompanying drawings, in which.

DETAILED DESCRIPTION

Hereafter, a detailed description will be given for preferred embodiments of the present disclosure. It should be pointed out that in the detailed description of the embodiments, for simplicity and conciseness, it is impossible to describe all the features of the practical embodiments in detail. It should be understood that in the process of a practical implementation of any embodiment, just as in the process of an engineering or a design project, in order to achieve a specific goal of the developer and in order to satisfy some system-related or business-related constraints, a variety of decisions will usually be made, which will also be varied from one embodiment to another. In addition, it is also be understood that although the effort made in such development work may be complex and time-consuming, some variations such as variations in design, manufacture and production on the basis of the technical contents disclosed herein are simply art known means relating to the contents disclosed herein, and the present disclosure should not be regarded as deficient in respect to such variations.

Unless defined otherwise, technical and scientific terms used in the Claims and the Description should have the same meanings as commonly understood by one of ordinary skill in the art to which the present disclosure belongs. The terms "a", "an" and the like do not denote a limitation of quantity, but denote the existence of at least one thing. The terms "comprises", "comprising", "includes", "including" are open ended expressions and do not exclude unnamed elements or objects. The term "disposed", "provided", "arranged" and "connected" do not require that the elements being discussed are physically or mechanically joined, and such terms include situations in which the elements being discussed are connected directly or indirectly.

Figure 1:
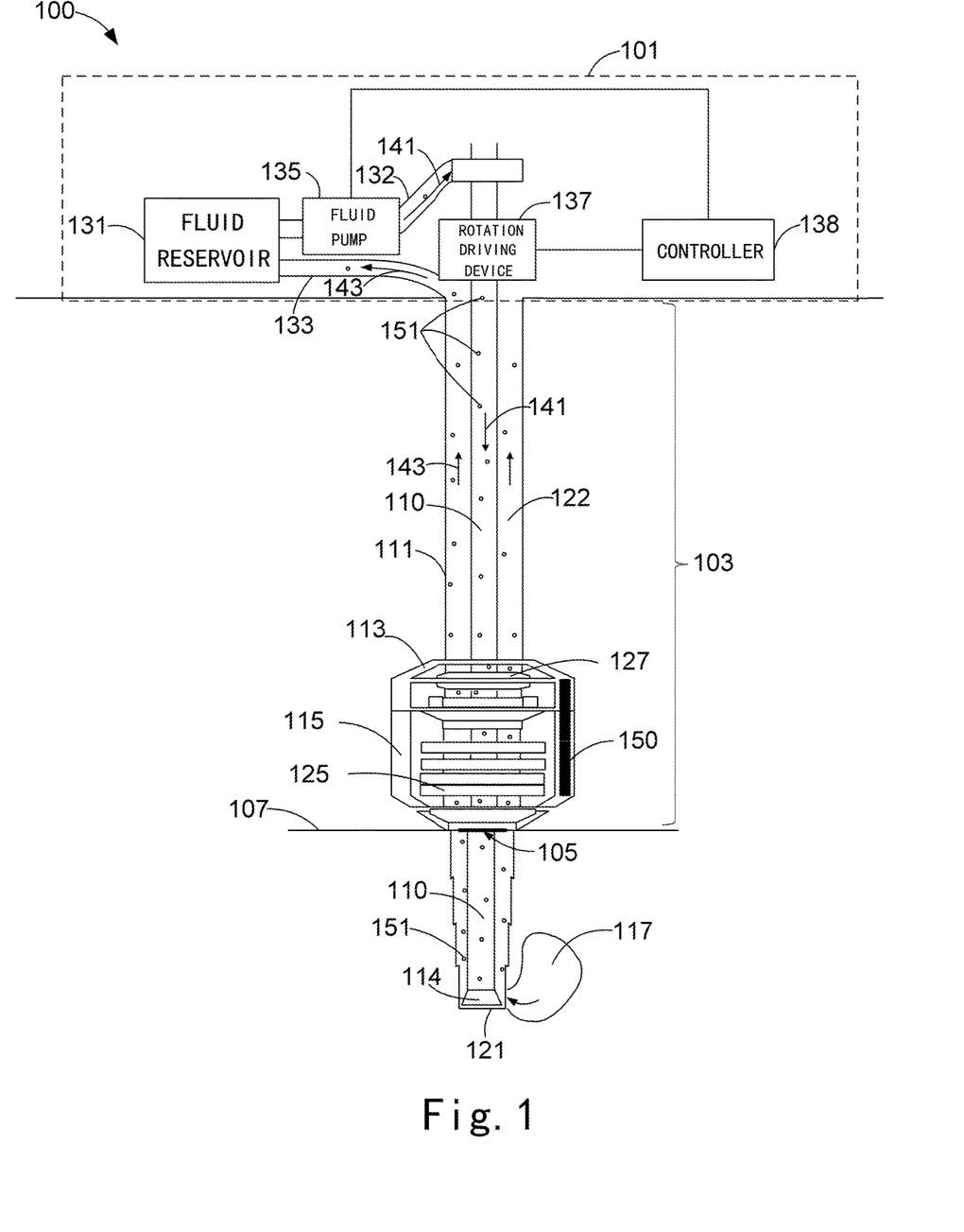
FIG. 1 illustrates a schematic diagram of an embodiment of a drilling system having drilling fluid parameter monitoring function in accordance with the present disclosure.

Referring to FIG. 1, which illustrates an embodiment of a drilling system 100 provided by the present invention and having drilling fluid parameter monitoring function. In the one or more embodiments, the drilling system 100 may be used to drill a wellbore 121 to access a hydrocarbon reservoir. In a non-limiting example, the wellbore 121 is an onshore wellbore. In an alternate embodiment, wellbore 121 is an offshore wellbore. In one or more embodiments, the drilling system 100 provided by the present invention may be utilized to access an offshore hydrocarbon reservoir.

As shown in FIG. 1, the drilling system 100 comprises a drilling platform 101 and a drilling assembly 103. In one or more embodiments, drilling platform 101 is deployed on a drilling vessel. In an alternate set of embodiments, drilling platform 101 is supported by an offshore truss. Drilling platform 101 may control the drilling assembly 103 as it penetrates formation 107 and creates wellbore 121. In the embodiment shown, drilling platform 101 includes fluid reservoir 131, fluid pump 135, rotary driving device 137, controller 138 and other components not shown on the drilling platform 101.

Drilling assembly 103 is connected to the bottom of the drilling platform 101. In one or more embodiments, drilling assembly 103 comprises a drill string 110, drill head 114, riser 111, lower marine riser package (LMRP) 113 and blowout preventer (BOP) 115.

During drilling operations, rotary driving device 137, under the control of controller 138, causes drill head 114 to rotate, penetrate formation 107 creating wellbore 121 thereby. Meanwhile, by action of one or more fluid pumps 135, drilling fluid 141, at times herein referred to as drilling mud, move from fluid reservoir 131 and is injected into drill string 110 via injection pipe 132 wherein it flows and reaches drill head 114. Thereafter, a returned drilling fluid 143 is returns toward the drilling platform 101 via the blowout prevent 115, lower marine riser, 113 and annular space 122. Returned drilling fluid may be directed, for example, to a portion of fluid reservoir 131 via return pipe 133. Annular space 122 is defined by the outer surface of drill string 110 and an inner surface of riser 111.

The drilling fluid 141 maintains a sufficient hydrostatic pressure to balance a pressure of a fluid from the formation entering the well bore, at times herein referred to as a formation fluid. The drilling fluid also acts to cool drill head 114, and entrains a mixture of solid materials created by the action of the drill on the formation during the creation of drilling of the wellbore.

The drilling fluid 141 may include water, oil and/or other drilling fluid ingredients. Returned drilling fluid, 143, may include solids formed during drilling of the wellbore. The returned drilling fluid 143 may be treated on the drilling platform 101, for example, by filtering the returned drilling fluid 143 to remove the substances such as formation solids contained therein. The treated returned drilling fluid 143 can be recycled and reused as drilling fluid 141.

As mentioned above, under certain circumstances a pressure of a fluid 117 entering into the wellbore from the formation may be greater than a pressure exerted by the drilling fluid above, and results in a kick. When a kick occurs, in the absence of appropriate controls, the returned drilling fluid 143 may be driven by fluid 117 through annular space 122 and erupt from the drilling assembly 103 upon arriving at the drilling platform 101 in a blowout event.

In the embodiment shown in FIG. 1, an LMRP 113 is disposed at an end of the riser 111 and is adjacent to the blowout preventer 115. The LMRP 113 comprises a connector 127 which joins the LMRP 113 to the riser 111. The LMRP 113, allows the drilling platform 101 to be separated from the wellhead 105 by disconnecting the connector 127.

The blowout preventer 115 is disposed between the LMRP 113 and the wellhead 105. The blowout preventer 115 comprises one or more shutoff valves 125, which are stacked together to seal, partially or completely, the wellhead 105 when a kick occurs.

In order to monitor multiple parameters of the returned drilling fluid 143 to provide important basis for kick prediction, the present disclosure further utilizes RFID technology. In the embodiment shown in FIG. 1, the RFID technology is implemented by mixing RF tags 151 with the drilling fluid 141, which is in turn injected into the drilling assembly 103. The RF tags may be added into the drilling fluid 141 manually or automatically, and are advantageously dispersed uniformly within drilling fluid 141.

As the RF tags 151 returns toward the drilling platform 101 within returned drilling fluid 143, data and other information encoded in RF tags 151 is read by reader module 150 and is transmitted to controller 138 via one or more communications links. The RF tags may be rapidly read, in a contactless manner, tag data and information encoded in the RF tags notwithstanding the complexity of the returned fluid composition.

As noted, in one or more embodiments, controller 138 disposed on the drilling platform 101 may communicate with the reader module 150 via a communication link. The reader module 150 may comprise a plurality of data ports, and the communication link may comprise a plurality of corresponding data communication lines for connecting the data ports of the reader module 150 with the controller 138. The controller 138 is used for receiving the data information from the RF tags and to calculate state parameters of RF tags in the returned drilling fluid. The state parameters may include movement speed (e.g., the movement speed along a direction in which the riser 111 extends) of an RF tag and a rotation speed along a cross section (e.g., I-I cross section) of the riser 111 under, for example, the action of a side eddy.

The state parameters of RF tags in the returned drilling fluid can be used to derive related parameters of the returned drilling fluid. The controller may calculate a flow velocity or flow volume of the returned drilling fluid based on the state parameters of RF tags.

Figure 2:
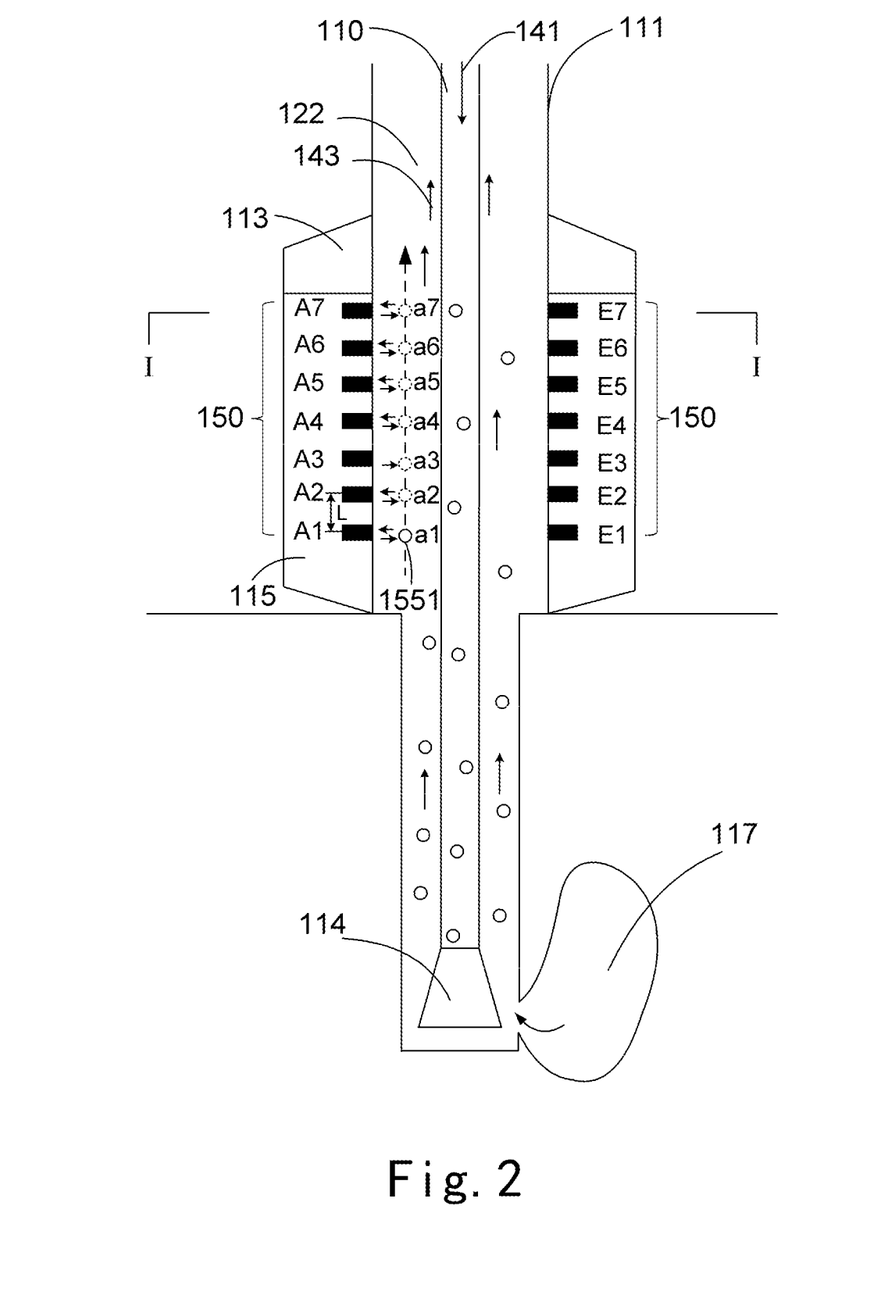
FIG. 2 illustrates a schematic diagram of an embodiment of a reader module mounted on the drilling system as shown in FIG. 1.
Figure 3:
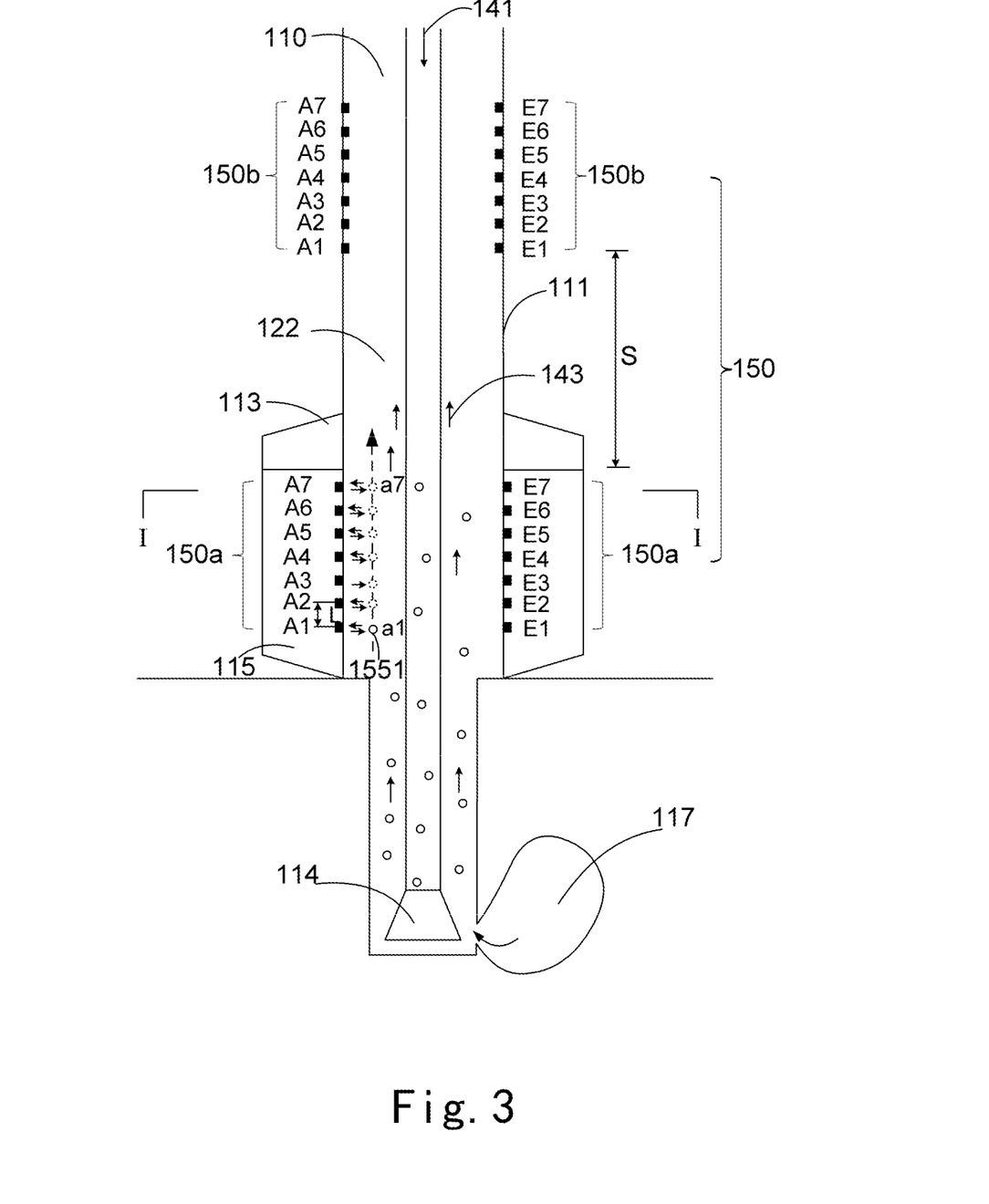
FIG. 3 illustrates a schematic diagram of another embodiment of a reader module mounted on the drilling system as shown in FIG. 1.
Figure 4:
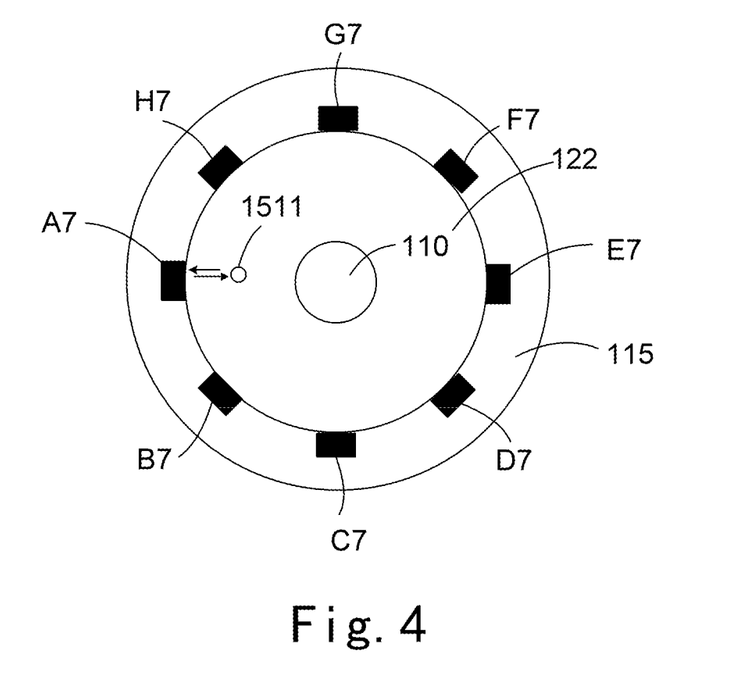
FIG. 4 illustrates a sectional schematic diagram of a drilling assembly in the drilling system along I-I as shown in FIG. 2 or FIG. 3.

Referring to FIG. 2 and FIG. 4, FIG. 2 illustrates an embodiment comprising a multi-reader module 150 mounted on the drilling assembly 103, and FIG. 4 illustrates the drilling assembly 103 along axis I-I as shown in FIG. 2 and FIG. 3. As shown in FIG. 2 and FIG. 4, the reader module 150 comprises 8 (eight) columns of reader units, marked as A to H (See FIG. 4), each column including 7 readers, marked as A1 to A7, E1 to E7 (See FIG. 2). In some embodiments, the reader module 150 may comprise any number of reader units, and each column of reader units may comprise any number of readers. In some embodiments, the number and mounting positions of the readers may be reasonably selected according to the cost and the requirement of accuracy for data detection. In the embodiment shown in FIGS. 2 and 4, the plurality of readers are arranged uniformly around the blowout preventer 115. In other embodiments, the reader module 150 may also be arranged on the riser.

Referring to FIG. 3, the figure illustrates another embodiment comprising reader modules 150 mounted on the drilling assembly 103. Reader module 150 comprises a plurality of reader groups, e.g. 150*a* and 150*b*, and the reader module 150 as shown in FIG. 2 may be used as each one of the reader groups as shown in FIG. 3. Each reader group may be arranged on any suitable portion of the drilling assembly 103, for example, reader group 150*a* is arranged on the blowout preventer 115, and reader group 150*b* is arranged on the riser 111. Each reader group is distributed in equal spacing S or in non-equal spacing along an extending direction of the riser 111. By arranging the plurality of reader groups at different positions of the drilling assembly, related parameters of the returned drilling fluid at different positions in the drilling assembly 103 can be monitored, thereby providing more information associated with the returned drilling fluid 143, so as to predict the occurrence of a kick in a more accurate manner.

Figure 5:
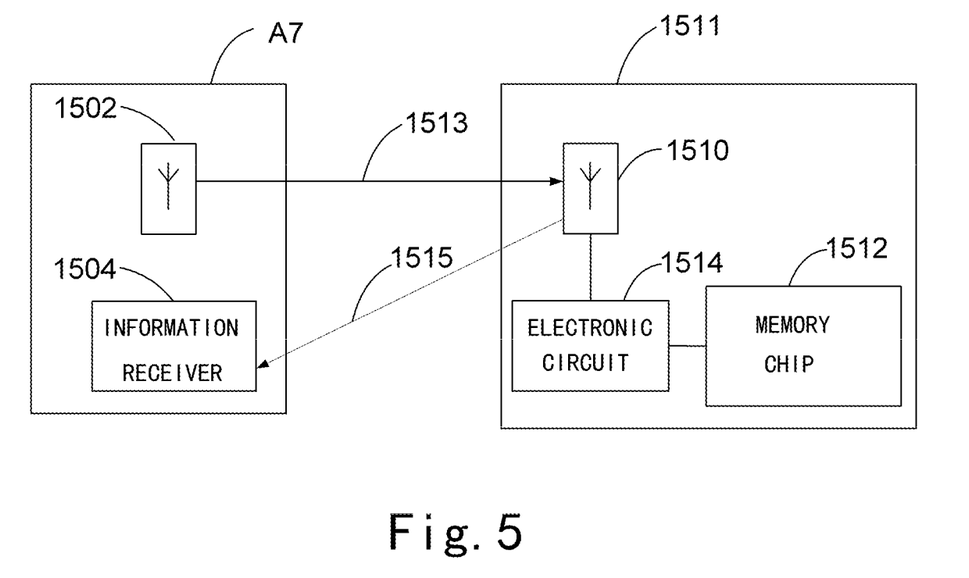
FIG. 5 illustrates a schematic diagram of an embodiment of a reader and an RF tag on the drilling system as shown in FIG. 1.

Referring to FIG. 5, the figure illustrates an encounter between a reader A7 and a passive RF tag 1511. RF tag 1511 has no internal power supply. Reader A7 transmits radio wave energy 1513 at a specific frequency to RF tag 1511 via an antenna 1502. Passive RF tag 1511 receives the radio wave energy 1513 via an antenna 1510 and drives an electronic circuit 1514 to send data information stored in a memory chip 1512 in a corresponding tag identification number signal 1515 to the reader A7 via the antenna 1510. An information receiver 1504 of the reader A7 receives the tag identification number signal 1505 and transmits the tag identification number data to the controller 138.

In some embodiments, the data information stored in the memory chip 1512 includes not only a tag identification number (a unique ID for each RF tag), but also other data information (e.g., encryption program) pre-stored in the RF tag 1511. The controller 138 may calculate, based on a time point when each reader receives the tag identification number information 1515 and a position of the corresponding reader, a moving speed of the RF tag 1511 which transmits this unique tag identification number information 1515 in the returned drilling fluid 143 along the extending direction of the riser 111 and a rotation speed of the RF tag 1511 along a cross section (e.g., I-I section) of the riser 111 under an effect of a side eddy. The moving speed of the RF tag 151 in the returned drilling fluid 143 can reflect the related parameter information (such as a flow velocity, a flow volume, and the like) of the returned drilling fluid 143.

In some embodiments, the RF tag 1511 is a semi-active RF tag. The semi-active RF tag 1511 comprises a small-sized power supply, which provides sufficient electric power to drive the memory chip 1512 such that the antenna 1510 does not need to receive electromagnetic wave energy from the reader A7, and RF tag is capable of transmitting the tag identification number signal 1515 on its own, thereby the data information stored in the memory chip 1512 can be transmitted more rapidly and more efficiently.

In some embodiments, the RF tag 1511 is an active RF tag. The active RF tag 1511 may comprises a power source to supply the electric energy needed by the internal memory chip 1512 to generate the external tag identification number signal 1515. The active RF tag 1511 may have a longer data transmission distance capability and a larger data storage capacity (e.g., storing position information of the reader) transmitted from the reader A7.

Referring back to FIG. 2, the readers A1~A7 are uniformly disposed along the extending direction of the riser 111. When the RF tag 1511 moves, along with the returned drilling fluid 143, from a cross section on which a position a1 resides upward to a cross section on which a position a7 resides along the extending direction of the riser 111 in the annular space 122, each of the readers A1~A7 receives the tag identification number signal 1515 sent out by the RF tag 1511 and transmits the tag identification number signal 1515 to the controller 138 in turn. Then, the tag identification number signal 1515 is decoded and identified in the controller 138. Since each RF tag 1511 includes its unique tag identification number, the controller 138 can decode and identify the corresponding RF tag 1511 based on the unique tag identification number information 1515.

Figure 6:
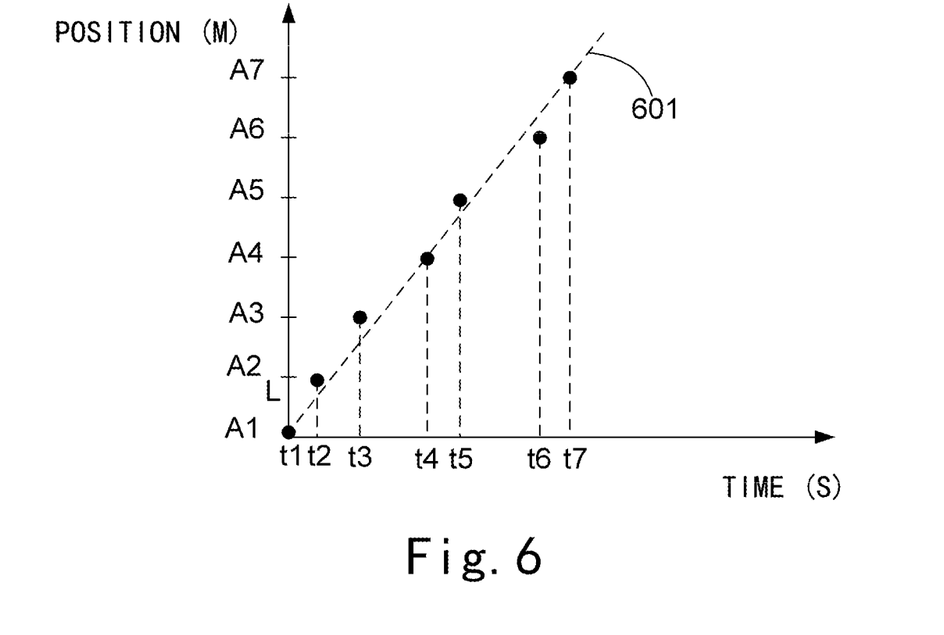
FIG. 6 illustrates a graph of flow velocity of a drilling fluid generated by the drilling system as shown in FIG. 1.

As shown in FIG. 6, the horizontal axis represents time (t1, t2, t3 . . . t7) when each of the readers A1~A7 in turn detects the tag identification number signal 1515 sent out by the RF tag 1511, and the longitudinal axis represents a position of each of the readers A1~A7 on the blowout preventer 115. In the embodiment shown, the distance between every two adjacent readers (e.g., reader A1 and reader A2) is L. Based on the above position parameters and time parameters, the controller 138 may implement a least squares method or other mathematical protocol to calculate the moving speed of the RF tag 1511 along the extending direction of the riser 111 in the returned drilling fluid 143. Curve 601 illustrates the resultant curve of velocity.

Similarly, the moving speeds of the other RF tags 151 along the extending direction of the riser 111 in the returned drilling fluid 143 can all be calculated in accordance with the same or similar methodology. Other reader units such as E1~E7 may also calculate the moving speed of each RF tag along the extending direction of the riser 111 in the returned drilling fluid 143 analogously. In some embodiments, for each RF tag 151, the moving speeds along the extending direction of the riser 111 are calculated, respectively, by the reader units such as A1~A7, E1-E7 are further averaged to obtain an average moving speed of each RF tag 151 along the extending direction of the riser 111, thus providing an alternate and at time more realistic expression of RF tag and fluid velocity.

Figure 7:
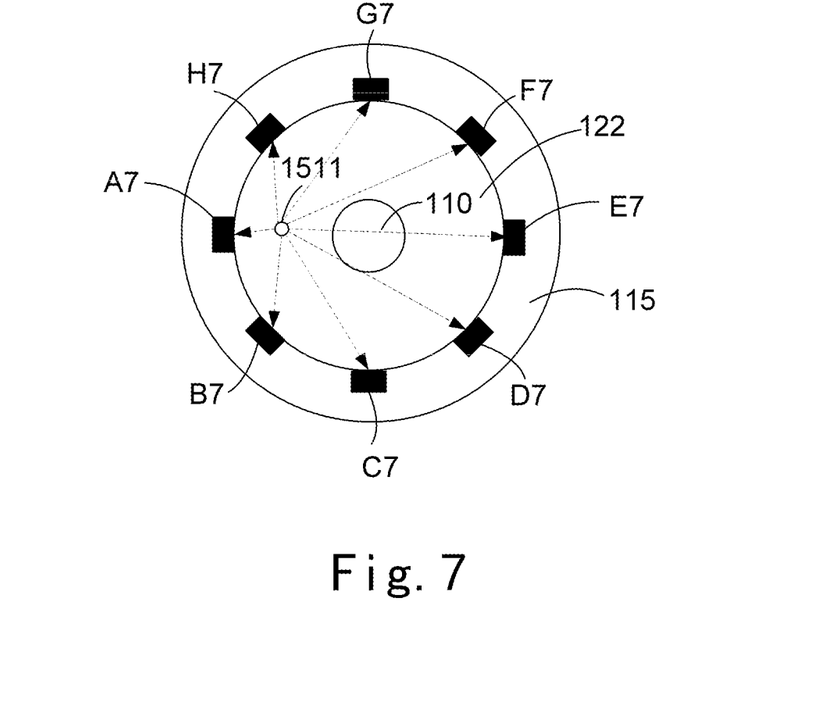
FIG. 7 illustrates another sectional schematic diagram of a drilling assembly along I-I in the drilling system as shown in FIG. 2 or FIG. 3.
Figure 8:
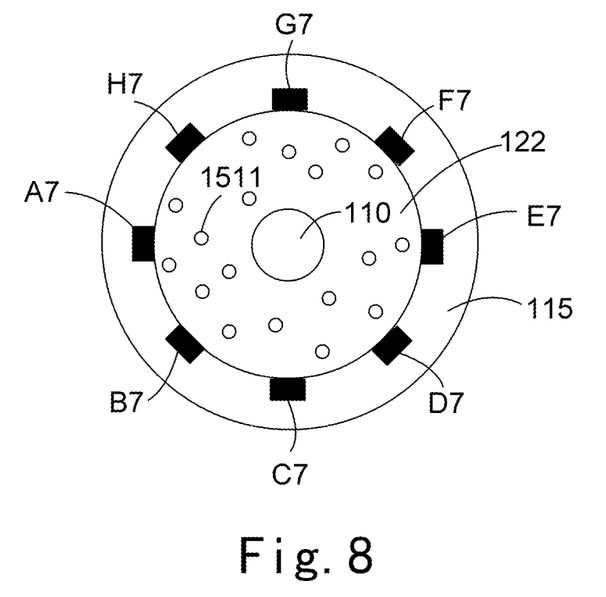
FIG. 8 illustrates another sectional schematic diagram of a drilling assembly along I-I in the drilling system as shown in FIG. 2 or FIG. 3.

Referring to FIG. 7, the figure illustrates a drilling assembly along axis I-I as shown in FIG. 2 and FIG. 3. In a given cross section, for example, on the cross section corresponding to readers A7~E7, each of the readers A7~E7 can detect the tag identification number information 1515 sent out by the RF tag 1511. A specific position parameter of the RF tag 1511 within the annular space 122 can be calculated based on a time difference on which each of the readers A7~E7 receives the tag identification number 1515. When the RF tag 1511 moves, in the annular space 122 as shown in FIG. 2, from the cross section position a1 upward to the cross section position a7, the specific position parameters of the RF tag at each cross section can be calculated. A rotation speed of the RF tag 1511 along the cross section I-I of the riser 111 can be calculated based on different position parameters of the RF tag 1511 in the annular space 122 and time interval parameters on which the different position parameters are detected. Similarly, as shown in FIG. 8, each of the readers A7-E7 can receive the tag identification number signals 1515 sent out by the other RF tags, so as to calculate the specific position parameters of the other RF tags in the annular space 122 and the rotation speeds of the other RF tags along the cross section I-I of the riser 111.

The flow velocity of the returned drilling fluid 143 may be calculated based on the moving speed of the at least one RF tag 151 along the extending direction of the riser 111 and the rotation speed of the at least one RF tag 151 along a cross section (e.g., I-I cross section) of the riser 111 under an effect of a side eddy. In some embodiments, the flow volume of the returned drilling fluid 143 may be calculated based on the flow velocity of the returned drilling fluid 143 and the cross sectional area of the annular space 122.

Figure 9:
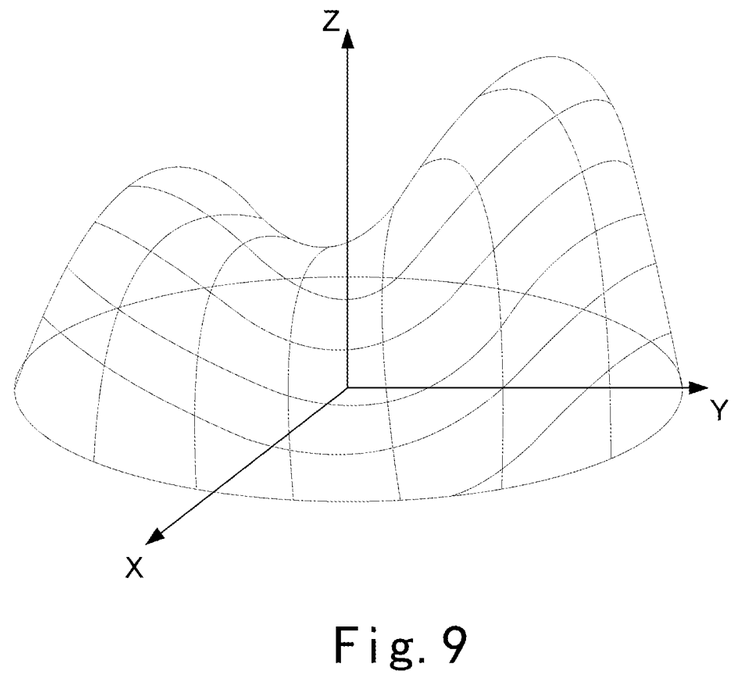
FIG. 9 illustrates a schematic diagram of an embodiment of flow velocities at different position points of the sectional fluid as shown in FIG. 8.

In some embodiments, in order to calculate the flow volume in a more accurate way, the moving speed of each of the RF tags 151 is calculated correspondingly at a cross section I-I of the riser 111. Since the moving speeds of each of the RF tags 151 may be different, the moving speeds of the RF tags 151 at different positions within annular space 122 can be obtained, as shown in FIG. 9. In the analysis, annular space 122 is divided into a plurality of cross sectional units. A flow volume at each cross sectional unit can be obtained by multiplying each cross sectional unit with the moving speed of the RF tag 151 corresponding to this cross sectional unit. Then the flow volume of the returned drilling fluid 143 can be obtained by summing the flow volumes at each of the cross sectional units.

Thus, it can be seen that a variety of parameters (e.g., flow velocity and flow volume) of the returned drilling fluid 143 can be obtained based on the reader module 150's reading for the data information of the at least one RF tag 151 and the related computational processing.

The related parameters of the returned drilling fluid 143 can provide basis for the subsequent kick prediction. For instance, when the flow velocity of the returned drilling fluid 143 exceeds the flow velocity of the injected drilling fluid 141, a kick may happen. When the flow volume of the returned drilling fluid 143 is far greater than the flow volume of the drilling fluid 141, a kick may happen. After a comprehensive analysis for the variety of parameters of the returned drilling fluid 143, it may predict whether a kick would happen.

When a kick happens, in some cases, the returned drilling fluid 143 is prevented from being delivered upward to the drilling platform 101, by partly closing a shutoff valve of the blowout preventer 115 to seal the annular space 122. In some cases, the wellhead 105 may be completely sealed, by completely closing the shutoff valve of the blowout preventer 115 to completely seal the wellhead 105, i.e., a channel of the drilling fluid 141 and a channel of the returned drilling fluid 143 are both shut off.

The use of RFID technology as disclosed herein enables the controller 138 to rapidly receive the data information of the at least one RF tag 151 read by the reader module 150. The controller 138 may identify each RF tag 151 and calculate the moving speed of each RF tag 151 along the extending direction of the riser 111 in the returned drilling fluid 143 and the rotation speed of each RF tag 151 along a cross section (e.g., I-I section) of the riser 111 under the effect of the side eddy. Furthermore, the controller 138 may simultaneously monitor a variety of parameters of the returned drilling fluid 143 based on the state parameters of each of the RF tags 151 in the returned drilling fluid 143 so as to provide important basis for kick prediction.

Figure 10:
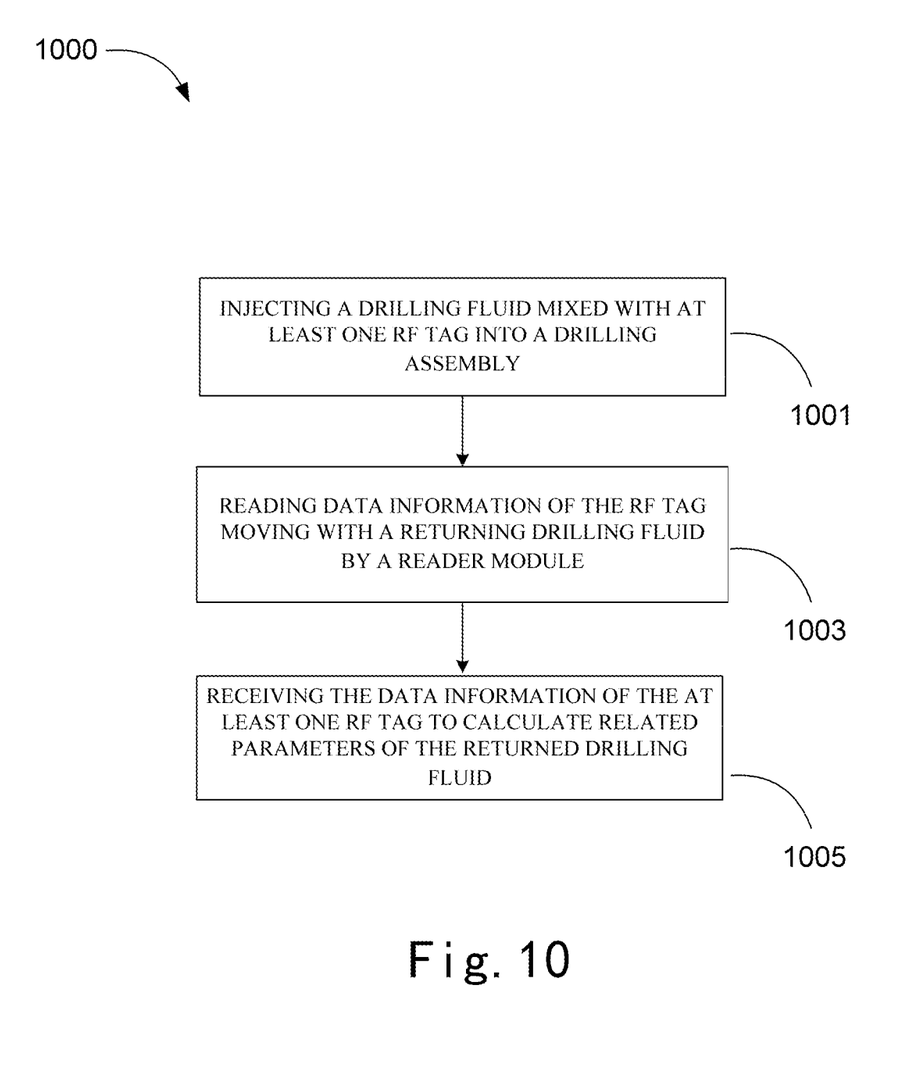
FIG. 10 illustrates a flow chart of an embodiment of a method for monitoring a drilling fluid parameter of the present disclosure.

Referring to FIG. 10, the figure illustrates a method for monitoring parameters of a returned drilling fluid in the drilling system 100. The method 1000 for monitoring parameters of a returned drilling fluid comprises the following steps:

Step 1001: a drilling fluid 141 mixed with at least one RF tag 151 is injected into a drilling assembly 103.

Step 1003: data information of the at least one RF tag 151 moving with a returned drilling fluid 143 is read by a reader module 150.

Step 1005: the data information of the at least one RF tag 151 is received to calculate related parameters of the returned drilling fluid 143.

The above descriptions have set forth in detail methodology useful to calculate the related parameters of the returned drilling fluid 143 based on the data information of the at least one RF tag 151, and will not be repeated here in relation to method 1000.

Although the present invention has been set forth in combination with specific embodiments, the person skilled in the art will be understand that many modifications and variations may be made to the present invention. Therefore, it should be recognized that the intention of the claims is to cover all these modifications and variations falling within the scope and spirit of the present invention.

What is claimed is:

1. A drilling system comprising:
a drilling assembly connected between a drilling platform and a wellhead for drilling a wellbore;
a reader module for reading data information of each of a plurality of radio frequency (RF) tags dispersed in a returned drilling fluid passing through a riser of the drilling assembly; the reader module comprising:
at least one reader group located at a position along the riser, the at least one reader group including a plurality of readers configured to read the data information of each of the plurality of RF tags, each reader being distributed along an extending direction of the riser at the position, each reader including at least one reader unit; and
a controller configured to receive the data information of each of the plurality of RF tags from the reader module to calculate related parameters of the returned drilling fluid at the position of the at least one reader group.

2. The drilling system according to claim 1, wherein the related parameters of the returned drilling fluid include a flow velocity or a flow volume of the returned drilling fluid at the position of the at least one reader group.

3. The drilling system according to claim 1, wherein the at least one reader group comprises a plurality of reader groups, each of the reader groups being distributed in equal spacing or non-equal spacing at different positions along the extending direction of the riser in the drilling assembly.

4. The drilling system according to claim 1, wherein each of the RF tags at least comprises a unique tag identification number, and the controller is configured to calculate a moving speed of each of the plurality of RF tags in the returned drilling fluid based on a distance parameter among the plurality of readers and a time parameter when a corresponding reader reads a tag identification number signal of each of the plurality of RF tags.

5. The drilling system according to claim 1, wherein each of the RF tags at least comprises a unique tag identification number, and the controller calculates a position parameter of each of the plurality of RF tags in an annular space of the drilling assembly based on a time interval on which each reader unit receives the tag identification number and a cross sectional area of the annular space.

6. The drilling system according to claim 5, wherein the controller is configured to calculate a rotation speed of the RF tag based on different position parameters of each of the plurality of RF tags in the annular space and time parameters when the different position parameters are detected.

7. The drilling system according to claim 1, wherein each reader includes a pair of reader units spaced circumferentially from each other around the riser.

8. The drilling system according to claim 7, wherein the controller is configured to calculate a moving speed of each of the plurality of RF tags in the returned drilling fluid based on a distance parameter among the plurality of readers and a time parameter when the pair of reader units of a corresponding reader reads a tag identification number signal of each of the plurality of RF tags.

9. The drilling system according to claim 1, wherein each reader includes a plurality of reader units spaced circumferentially from each other around the riser.

10. The drilling system according to claim 9, wherein the controller is configured to determine a position parameter of each of the plurality of RF tags indicative of the location of each of the plurality of RF tags within the riser at the location of each respective reader.

11. The drilling system according to claim 10, wherein the controller is configured to determine rotation speed of the fluid using the position parameter of each of the plurality of RF tags determined by each of the readers of the at least one group reader.

12. A method for monitoring parameters of a drilling fluid, the method comprising:
   injecting the drilling fluid mixed with a plurality of radio frequency (RF) tags into a drill string of a drilling assembly;
   reading data information of each of the plurality of RF tags moving with a returned drilling fluid passing through a riser of the drilling assembly, the drill string extending through at least a portion of the riser, by a reader group comprising a plurality of readers located at a position along the riser and distributed in an extending direction of the riser, at the position the reading of data information comprising reading the data information of each of the plurality of RF tags at multiple locations distributed in the extending direction of the riser;
   receiving the data information of each of the plurality of RF tags from the reader group; and
   calculating related parameters of the returned drilling fluid at the position of the reader group based on the data information received from the plurality of readers.

13. The method according to claim 12, wherein the related parameters of the returned drilling fluid include a flow velocity or a flow volume of the returned drilling fluid at the position of the at least one reader group.

14. The method according to claim 12, wherein the calculating related parameters of the returned drilling fluid comprises: calculating a moving speed of each of the plurality of RF tags in the returned drilling fluid based on a distance parameter between the plurality of readers and a time parameter when a corresponding reader reads a tag identification number signal of each of the plurality of RF tags.

15. The method according to claim 12, wherein:
   the reading data information of each of the plurality of RF tags further comprises reading the data information of each reader having a plurality of reader units spaced circumferentially from each other around the riser;
   the receiving the data information of each of the plurality of RF tags further comprises receiving data information of each of the plurality of RF tags from the plurality of reader units of each reader of the at least one reader group; and
   the calculating related parameters of the returned drilling fluid at the position of the reader group further comprises determining a position parameter of each of the plurality of RF tags indicative of the location of each of the plurality of RF tags within the riser at the location of each respective reader.

16. The method according to claim 15, wherein the calculating related parameters of the returned drilling fluid at the position of the reader group further comprises determining rotation speed of the fluid using the position parameter of each of the plurality of RF tags determined by each of the readers of the at least one group reader.

17. A blowout preventer of a drilling system, the blowout preventer comprising:
   a reader module for reading data information of each of a plurality of RF tags dispersed in a returned drilling fluid passing through a riser of the drilling system, the data information of each of the plurality of RF tags including a unique tag identification number, the reader module comprising:
      at least one reader group located at a position along the blowout preventer, the at least one reader group including a plurality of readers configured to read the data information of each of the plurality of RF tags, each reader being distributed along an extending direction of the blowout preventer at the position, each reader including at least one reader unit; and
   a controller configured to receive the data information of each of the plurality of RF tags from the reader module to calculate related parameters of the returned drilling fluid at the position of the at least one reader group.

18. The blowout preventer according to claim 17, wherein the controller calculates a moving speed of each of the plurality of RF tags in the returned drilling fluid based on a distance parameter among the plurality of readers and a time parameter when a corresponding reader reads a tag identification number signal of each of the plurality of RF tags.

19. The blowout preventer according to claim 17, wherein the controller calculates a position parameter of each of the plurality of RF tags in an annular space of the drilling assembly based on a time interval on which each reader unit receives the tag identification number and a cross sectional area of the annular space.

20. The blowout preventer according to claim 19, wherein the controller calculates a rotation speed of each of the plurality of RF tags based on different position parameters of each of the plurality of RF tags in the annular space and time parameters when the different position parameters are detected.

21. The blowout preventer according to claim 17, further includes a valid in fluid communication with the wellbore, wherein the controller provides a control signal to actuate the valve in response to the related parameters of the returned drilling fluid calculated by the controller.

\* \* \* \* \*